(12) United States Patent
Dempsey

(10) Patent No.: US 7,290,826 B2
(45) Date of Patent: Nov. 6, 2007

(54) TRAFFIC COLLISION COVER

(76) Inventor: John Patrick Dempsey, 2159 Derby St., Camarillo, CA (US) 93010

( * ) Notice: Subject to any disclaimer, the term of this patent is extended or adjusted under 35 U.S.C. 154(b) by 0 days.

(21) Appl. No.: 11/213,370

(22) Filed: Aug. 26, 2005

(65) Prior Publication Data

US 2007/0046063 A1    Mar. 1, 2007

(51) Int. Cl.
*B60J 11/00* (2006.01)

(52) U.S. Cl. .................. 296/136.13; 150/166

(58) Field of Classification Search ........... 296/136.01, 296/136.1, 95.1, 136.11, 136.13; 160/166; 150/166

See application file for complete search history.

(56) References Cited

U.S. PATENT DOCUMENTS

| | | |
|---|---|---|
| 2,764,830 A | 10/1956 | Frey |
| 3,347,527 A | 10/1967 | Andrews |
| 4,105,190 A | 8/1978 | Curtis |
| 4,124,196 A | 11/1978 | Hipskind |
| 4,186,913 A | 2/1980 | Byrd, Jr. |
| 4,978,245 A | 12/1990 | White |
| 5,015,119 A | 5/1991 | Schmanski |
| 5,029,819 A | 7/1991 | Kane |
| 5,072,979 A * | 12/1991 | Swinton ............ 293/128 |
| 5,152,092 A | 10/1992 | O'Brien |
| 5,269,623 A | 12/1993 | Hanson |
| 5,275,460 A * | 1/1994 | Kraus ............ 296/136.13 |
| 5,553,648 A | 9/1996 | Goharjou |
| 6,036,249 A | 3/2000 | Kuntz |
| 6,070,629 A * | 6/2000 | Whiteside ............ 150/166 |
| 6,394,528 B2 * | 5/2002 | Hoenack ............ 296/136.01 |
| 6,578,900 B1 * | 6/2003 | Riportella ............ 296/136.12 |
| 2002/0113458 A1 * | 8/2002 | Heiland ............ 296/136 |
| 2004/0219852 A1 * | 11/2004 | Eichhorn et al. ............ 442/301 |

FOREIGN PATENT DOCUMENTS

JP    11209936    8/1999

OTHER PUBLICATIONS

Emergency Response Services Web Site based in Hereford, United Kingdom, at http://www.ers999.com/support.html on Aug. 24, 2005.

* cited by examiner

*Primary Examiner*—Dennis H. Pedder

(57) ABSTRACT

A traffic collision cover is disclosed which restricts the view of physical damage to one or more vehicles involved in a traffic accident to passing motorists and pedestrians who may slow down and obstruct traffic while observing an accident scene. This invention allows emergency personnel to quickly cover one or more vehicles or parts of vehicles with fabric to hide the damage done in an accident. As a result, this invention helps prevent traffic congestion and increase traffic flow at accident scenes.

1 Claim, 6 Drawing Sheets

TRAFFIC COLLISION COVER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention is a traffic collision cover which restricts the view of physical damage to one or more vehicles involved in a traffic accident to passing motorists and pedestrians.

2. Prior Art

The use of a safety device used to block or restrict the viewing of an accident scene to passing motorists and pedestrians is known in the prior art. Many of these inventions are designed to increase traffic flow in the vicinity of a traffic accident. As the number of vehicles increase on our highways, freeways, and roads, every effort should be looked at to minimize traffic congestion and commute time. This is especially true in major metropolitan areas where traffic has already saturated the anticipated capacity of these roadways. When an accident occurs on a freeway or highway, traffic is typically impacted in both directions.

While no invention can erase the commotion of emergency vehicles at the scene and the related slowdown, by blocking the view of the actual vehicles involved in the accident, the amount of time motorists spend rubbernecking the accident scene is anticipated to be reduced. This allows more traffic to flow by an accident scene.

There are a number of inventions designed to restrict the view of passing motorists and pedestrians in the prior art.

For example, U.S. Pat. No. 6,036,249 to Kuntz (2000) allows emergency vehicles to have an accident shield device installed in their trunk. Upon arriving at an accident scene, emergency personnel deploy the accident shield by unfolding panels. The expanded panels are secured by being connected to the emergency vehicle and by adjustable feet at the bottom of the panels. The end result is a visual barrier between the passing motorists and accident scene. Several disadvantages to this approach are the accident shield device is large, takes up a lot of space, and adds significant weight to the emergency vehicle. As the emergency vehicle is attached to the accident shield, the accident shield would need to be taken down before the emergency vehicle could move. The accident shield has a large surface area which may need to be secured in adverse weather conditions.

U.S. Pat. No. 5,553,648 to Goharjou (1996) allows emergency personnel to set up a portable wall at an accident scene. The portable wall consists of a flexible sheet, collapsible vertical posts, and base components. The base components are used to support the vertical posts. The vertical posts are used to support the flexible sheet. At the upper end of each vertical post is a ring used to attach stabilizing cords. The other end of each cord is tied to hooks which are physically screwed into the ground on each side of the vertical posts. Several disadvantages to this approach are the portable wall is large, takes up a lot of space, and adds weight to the emergency vehicle. Hooks need to be physically attached into the ground in order to support this device in the upright position. But if the accident occurs on a multilane freeway built of solid concrete where you cannot easily penetrate the ground, there may be no way to use this invention as described.

U.S. Pat. No. 5,269,623 to Hanson (1993) obstructs oncoming motorists' view of an accident scene by using an inflatable screen. The main conduit has outwardly projected leg members for supporting the screen and upwardly projecting stanchions spaced apart. Pressurized gas is used to rapidly deploy the shield into its operative position. Ground engaging or retention devices are used to hold the shield in place at the accident site. Several disadvantages to this approach are the device is large, takes up a lot of space, and adds weight to the emergency vehicles. The inflatable screen provides a large surface area when deployed. As such, it must be firmly secured to ensure it does not move into the path of passing motorists under adverse weather conditions, such as a gust of wind. But if the accident occurs on a multilane freeway built of solid concrete, it may not be easy to secure this invention as described.

U.S. Pat. No. 4,186,912 to Byrd, Jr. (1980) creates a visual barrier using an elongated screen of light-reflective material supported at each end by folding posts. The two end posts are secured using mounting cables to any conveniently fixed objects, such as a tree, telephone pole, building, or another motor vehicle. Several disadvantages to this approach are the device is large, takes up a lot of space, and adds weight to the emergency vehicle. To support the end posts, "fixed objects" first need to exist at the accident scene (which may not be the case) and second need to be spaced apart from each other as determined by the length of the screen. In the most likely scenario, this ties up one or two emergency vehicles, forces their location at the accident scene in potentially awkward configurations, and the screen must be taken down if an emergency vehicle needs to move.

U.S. Pat. No. 4,124,196 to Hipskind (1978) describes a portable device for screening off an accident scene from view using a non-transparent, elongated sheet of thin flexible material which is deployed from a portable cylindrical container, similar to a retractable curtain rod. This device is attached to the bumper of an emergency vehicle. Tripod based poles are used to support the elongated sheet in an upright position. Several disadvantages to this approach are the device is large, takes up a lot of space, and adds significant weight to the emergency vehicle. As the emergency vehicle is attached to the accident shield device, the accident shield device would need to first be taken down before the emergency vehicle could move. Also, this device has a large surface area which must be secured in adverse weather conditions. The tripods would most likely require heavy weights to prevent them from tipping in high winds.

Japan Pat. No. JP11209936 to Nobuhiro (1999) describes an accident spot shielding device consisting of a shielding curtain with support posts at each end. The shielding curtain is held upright by inserting the bottom of each post into a hole placed in cylindrical supports. The shield spreads out and folds up similar to the bellows of an accordion. Several disadvantages to this approach are the device is large, takes up a lot of space, and adds significant weight to the emergency vehicle. To effectively prevent sightseeing congestion using this device, multiple screens would need to be set up at the accident scene. The screens are supported by heavy supports. Even with the heavy supports, adverse weather conditions would make this device susceptible to being blown over by a high gust of wind and potentially into traffic causing even more congestion.

In performing web searches, the term "Traffic Collision Cover" was found to match text on the Emergency Response Services Web Site based in Hereford, United Kingdom, at http://www.ers999.com/support.html. This web page uses the term "Road Traffic Collision Rescue Cover" but with no further explanation. In contacting them, this is a service and is not a product. The reference is used to indicate that their company provides road traffic collision coverage (i.e., ambulances and medics) in foreign countries, such as Iraq. Although the title of this invention matches text on their web page, there is no prior art to compare with.

As stated above, there are many disadvantages of the prior art. These disadvantages can be summarized as:
1. All prior art above is large, takes up a lot of space, and can add significant weight to an emergency vehicle in order to provide a temporary wall barrier at an accident scene. To be effective, the temporary wall barrier needs to be approximately five feet high and long enough to screen off a large area. In U.S. Pat. No. 4,186,912 to Byrd, Jr. (1980), the length of the screen was stated as "thirty-six feet long or larger". But emergency vehicles may not have a large amount of extra space to support the prior art. Adding additional weight may also impact the acceleration and response times of existing emergency vehicles.
2. All prior art above creates a temporary wall barrier between the passing motorists and vehicles involved in an accident. None of these inventions physically attach itself to the vehicles involved in the accident.
3. Some prior art above, e.g., U.S. Pat. No. 6,036,249 to Kuntz (2000) and U.S. Pat. No. 4,124,196 to Hipskind (1978), use an emergency vehicle to support the barrier when it is set up. The main disadvantage of this approach is if the emergency vehicle needs to move, emergency personnel may need to take down the barrier first or move the vehicle carefully with the attached barrier still extended.
4. All prior art above must be set up and taken down. Due to the size and number of components of the prior art, this may be a non-trivial, time consuming task for most, if not all, of the above inventions.
5. All prior art above need to address how to prevent movement of the invention once it has been set up. For example, inventions need to address adverse weather conditions, such as high winds. In order to restrict the ability of passing motorists from viewing the accident scene, many prior inventions create a large surface area to block the motorists' view. To minimize movement due to wind, some screens use a mesh fabric or have cut flaps in the fabric to allow the wind to pass through. However if a high gust of wind were to hit such a large surface area, the invention itself may act as a sail and may be moved into the path of the passing motorists potentially causing an unintentional accident. To counter this undesired movement, some prior inventions use additional weight to better secure their invention. But adding additional weight to emergency vehicles is not an advantage. Other inventions are required to be tied to objects (e.g., hooks) physically attached to the ground in order for them to maintain an upright position. But if the accident occurs on a multilane freeway built of solid concrete where you cannot easily penetrate the ground, there may be no way to use the invention as described since the posts cannot be supported in the upright position.

OBJECTS AND ADVANTAGES

When compared to the prior art mentioned above, this invention differs substantially in a number of ways. The objects and advantages of this invention over prior art are:
1. This invention is significantly smaller, takes up less space, and is lightweight, while still supporting the main goal of restricting the motorists' view of an accident.
2. There is no temporary wall barrier setup at the accident scene to restrict the view of the vehicles involved in the accident to passing motorists. Instead, the present invention physically attaches itself to one or more vehicles involved in the accident.
3. Emergency vehicles are free to move at any time as emergency vehicles are not used to provide support for this invention.
4. This invention may be set up and taken down faster than most, if not all, prior art.
5. This invention costs less to build than most, if not all, prior art.
6. As an option, this invention can stay attached to the vehicle in order to wrap the vehicle as it is being towed. Keeping this invention attached to the vehicle during transport may help to prevent glass, metal, and other material loosened by the accident from dropping onto the roadway as the vehicle is being towed. This potentially could prevent a new accident from occurring, one caused by debris falling off from the original accident. By properly labeling this invention, the responding agency applying the cover can simply stop by the tow yard at some later time to retrieve this invention.
7. There is no large, upright surface area which would need to withstand the full force of the wind as is the case with the prior art. Under certain circumstances depending on the direction and speed of the wind, wind can actually help keep this invention attached to the vehicle by pressing the traffic collision cover to the vehicle.

Further objects and advantages of this invention will become apparent from a consideration of the drawings and ensuing description.

SUMMARY OF INVENTION

The present invention is a traffic collision cover which restricts the view of physical damage to one or more vehicles involved in a traffic accident to passing motorists and pedestrians who may slow down and obstruct traffic while observing an accident scene. If this invention is proven to be effective, each responding agency (e.g., highway patrol, fire department, and others) can determine the criteria and situations when they would use this invention.

The components of my invention are:
  Fabric
  Magnets
  Grommets
  Adhesive
  Coating or encasing for magnets
  Small strips of fabric
  Heavy duty thread While any fabric can be used with this invention, desirable features for the fabric are that it be: fire retardant, weather resistant, waterproof, mildew proof, tear resistant, acid resistant, lightweight, flexible under very cold conditions, have grommets to allow the fabric to be tied more securely to a vehicle, and be provided in various safety colors with or without reflective stripes, chevrons, or reflective attributes. The fabric can come in various sizes. For example, a small size could be used to cover or partially cover a small car or truck while a large size could be used to cover or partially cover a large van, truck, or SUV. Other types of vehicles could also be covered such as airplanes or helicopters which may crash land on freeways due to some type of malfunction. Providing various sizes of the fabric would make it easier for safety personnel to attach this invention to a vehicle. Text, messages, and/or logos can optionally be displayed on the fabric in view of passing motorists, such as displaying "Drive Safely" or "California Highway Patrol" with their official logo underneath.

While any magnets can be used with this invention, desirable features for the magnets are that they be: strong enough to hold the fabric in place under normal conditions, coated or encased to avoid scratching the vehicle when this invention is applied to and taken off the vehicles, coated or encased to prevent the magnets from breaking, and lightweight. Magnets are the primary method to hold this invention in place after safety personnel have attached this invention to one or more vehicles. The number of magnets contained in this invention can vary as well as the size and shape of each magnet. To support a large version of this invention, more and larger magnets may be needed to securely attach this invention to a vehicle. Similarly, to support a small version of this invention, fewer and smaller magnets can be used. In addition, external magnets, which are not attached to the fabric, may be used to provide additional support. The external magnets can come in various shapes, sizes, and utility to help attach this invention under various weather conditions.

While any method for embedding the magnets into the fabric can be used with this invention, desirable features are that the magnets be firmly attached to the fabric by sewing the magnets to the fabric, using adhesives to attach magnets to the fabric, or by any other means or combination of means. When embedding the magnets to the fabric, the polarity of the magnets can be used to maintain the shape of the traffic collision cover. For example, magnets which attract each other can be used to hold the corners of the traffic collision cover in place. This is beneficial if only half or a fourth of the traffic collision cover size is desired to cover a vehicle. As such, the magnet's placement and its polarity can be considered when positioning and attaching the magnets to the fabric. Optionally, once the magnets have been embedded or attached, they may be labeled, e.g., by using numbers, letters, color coded, +/−symbols, or any other symbols.

Grommets in the invention, if present, would typically be found along the edge of the fabric to allow safety personnel to tie down this invention to one or more vehicles using rope, string, ball ties, tie downs, tarp ties, bungee cords, hook-and-loop fasteners, or other means. The external magnets, some which may be attached to a hook, can also use the grommets to attach this invention to a vehicle. As some vehicle exteriors are not made of steel or use less steel in their overall construction, the main method for attaching this invention to such vehicles would be to tie down this invention using the grommets to one or more vehicles using rope, string, ball ties, tie downs, tarp ties, bungee cords, hook-and-loop fasteners, or other means.

Holes may be placed in the fabric, for example, to provide a way to cover the vehicle with an external and extended radio antenna which does not retract.

BRIEF DESCRIPTION OF THE DRAWINGS—FIGURES

Figure 1:
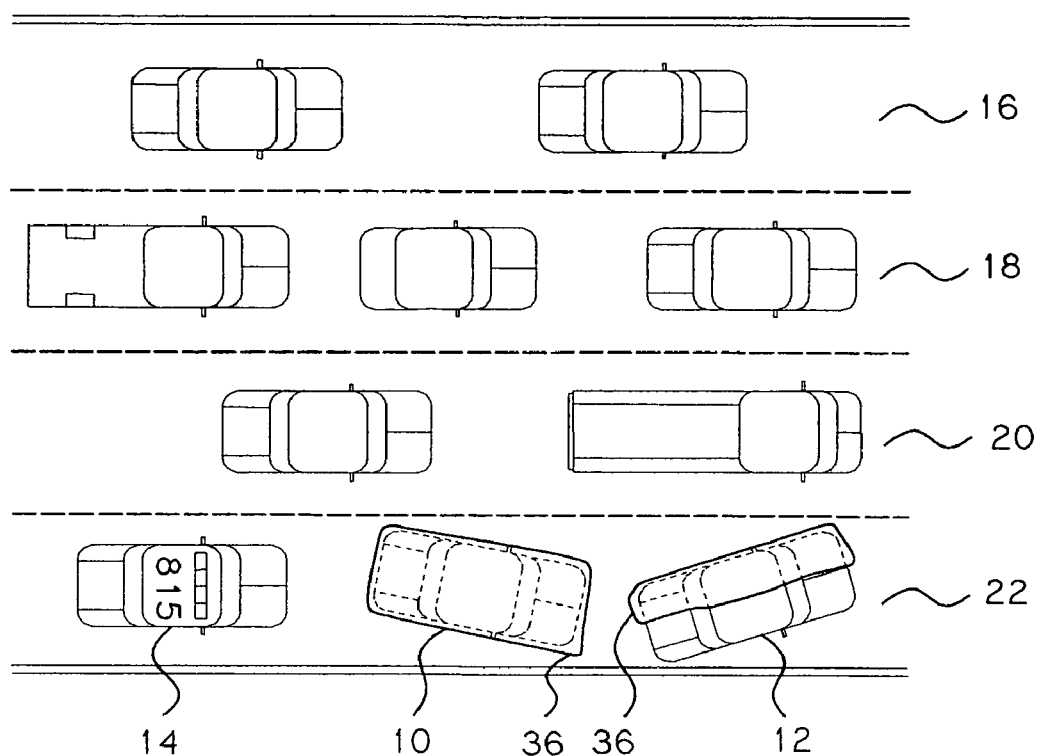
FIG. 1 shows a two vehicle accident using two separate traffic collision covers.

| DRAWINGS - REFERENCE NUMERALS |
| --- |
| 10 vehicle covered completely |
| 12 vehicle half covered |
| 14 emergency vehicle |
| 16, 18, 20, 22 four traffic lanes |
| 24 fabric |
| 26 grommet |
| 28 magnet |
| 30 small strip of fabric |
| 32 adhesive |
| 34 sewing stitches |
| 36 traffic collision cover |
| 38 vehicle |
| 40 smaller traffic collision cover |
| 42 appendages |

DETAILED DESCRIPTION—PREFERRED EMBODIMENT—FIGS. 1 THROUGH 5

FIG. 1 shows a two vehicle accident using two separate traffic collision covers 36. One cover covers vehicle 10 completely while vehicle 12 is half covered. Vehicle 14 is the first emergency vehicle at the scene of the accident parked in the blocked traffic lane 22. The occupants in this accident were unharmed and wait outside of their vehicles for tow trucks to arrive. Emergency personnel (e.g., highway patrol) place the traffic collision covers 36 on vehicles 10 and 12 to restrict the view of physical damage to the vehicles involved in a traffic accident to passing motorists in traffic lanes 16, 18, and 20, who may slow down and obstruct traffic while observing an accident scene. Using the traffic collision covers 36 helps keep traffic flowing which may allow the additional emergency vehicles to arrive at the accident scene faster.

Figure 2A:
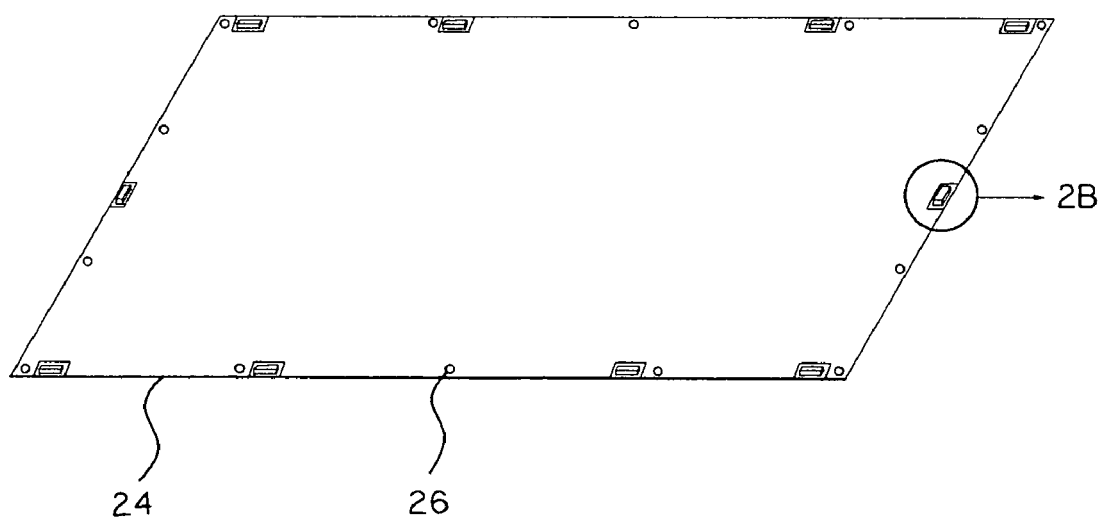
FIG. 2A shows a perspective view of the preferred embodiment of a traffic collision cover laid out flat and not attached to any vehicle.

FIG. 2A shows a perspective view of the preferred embodiment of a traffic collision cover. In this figure, a fabric 24 is laid out flat and not attached to any vehicle. Grommets 26, indicated by circle shaped objects, can be used to tie the fabric 24 to the vehicle using rope, string, ball ties, tie downs, tarp ties, bungee cords, hook-and-loop fasteners, or other means. Magnets, contained in circle 2B, are described in FIG. 2B.

Figure 2B:
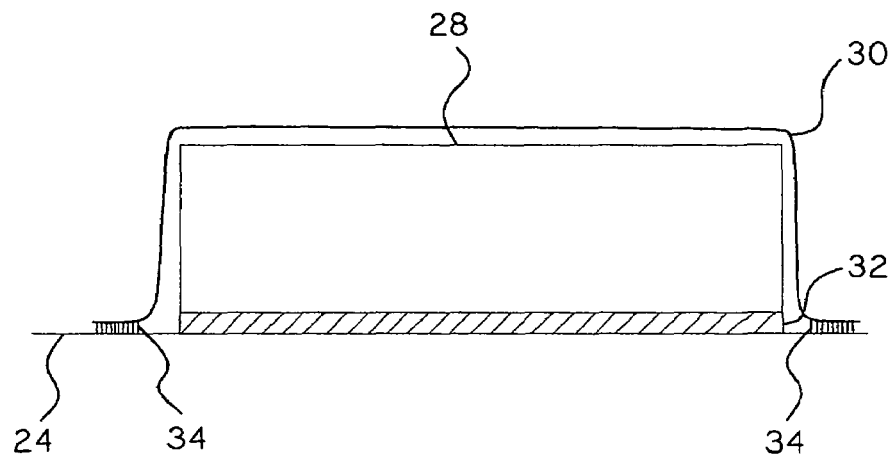
FIG. 2B is an enlarged side view of the portion of the traffic collision cover taken at circle 2B of FIG. 2A.

FIG. 2B shows a side view of the preferred embodiment of attaching one magnet 28 to the fabric 24 using an adhesive 32, such as glue, and then sewing stitches 34 around the magnet 28 using a small strip of fabric 30 to provide additional support. While the desirable features for the magnet 28 were previously discussed, the magnet 28 is encased in plastic prior to gluing it to the fabric 24. It should be noted that FIGS. 2A and 2B represent one of many possible configurations with respect to the size of the fabric 24 and placement, number, and size of magnets 28 and grommets 26.

Figure 3A:
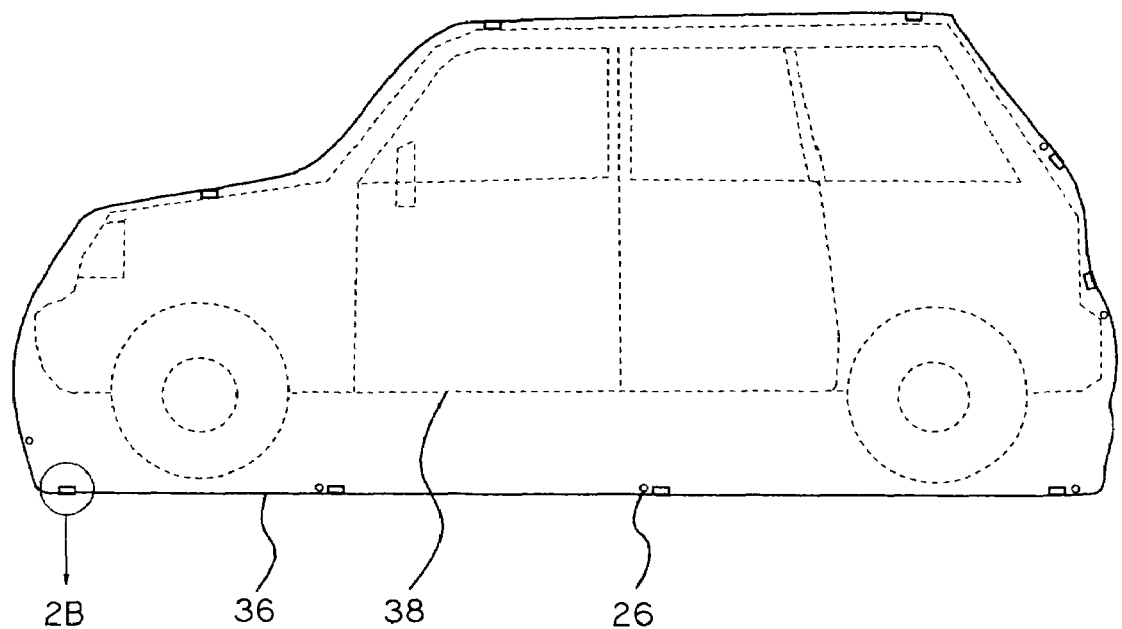
FIG. 3A shows the side view of a vehicle with the traffic collision cover attached.

FIG. 3A shows the side view of a vehicle with a traffic collision cover 36 attached. The entire side of a vehicle 38 is hidden by the traffic collision cover 36. Magnets, as found in circle 2B, temporarily attach the traffic collision cover 36 to the vehicle 38. Grommets 26, which are drawn as circular shaped objects, can also be used to tie down the traffic collision cover 36 using rope, string, ball ties, tie downs, tarp ties, bungee cords, hook-and-loop fasteners, or other means when needed.

Figure 3B:
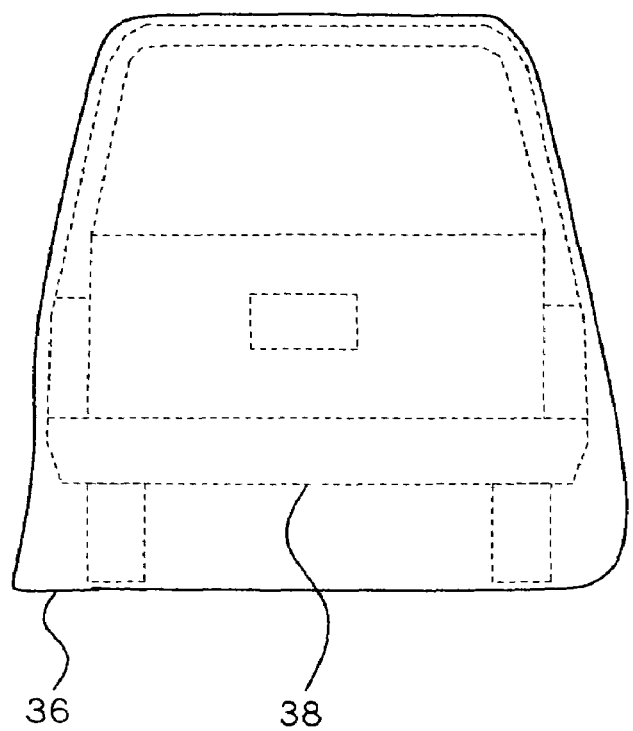
FIG. 3B shows the back view of a vehicle with the traffic collision cover attached.

FIG. 3B shows the back view of a vehicle 38 with a traffic collision cover 36 attached. The traffic collision cover 36 covers the entire back side of the vehicle 38. This is the back view of the same vehicle drawn in FIG. 3A.

Figure 3C:
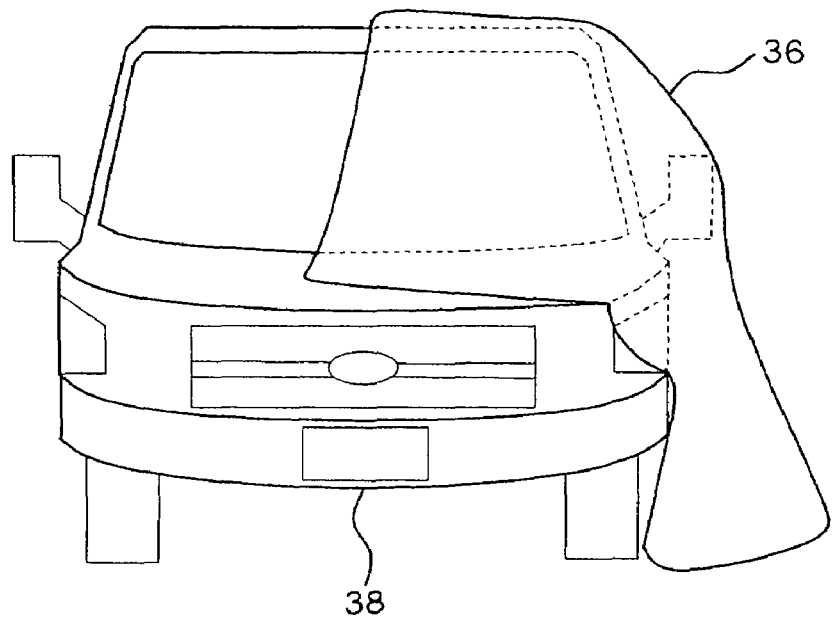
FIG. 3C shows the front view of a vehicle with the traffic collision cover attached.

FIG. 3C shows the front view of a vehicle 38 with a traffic collision cover 36 attached. This is the front view of the same vehicle as shown in FIGS. 3A and 3B.

Figure 4:
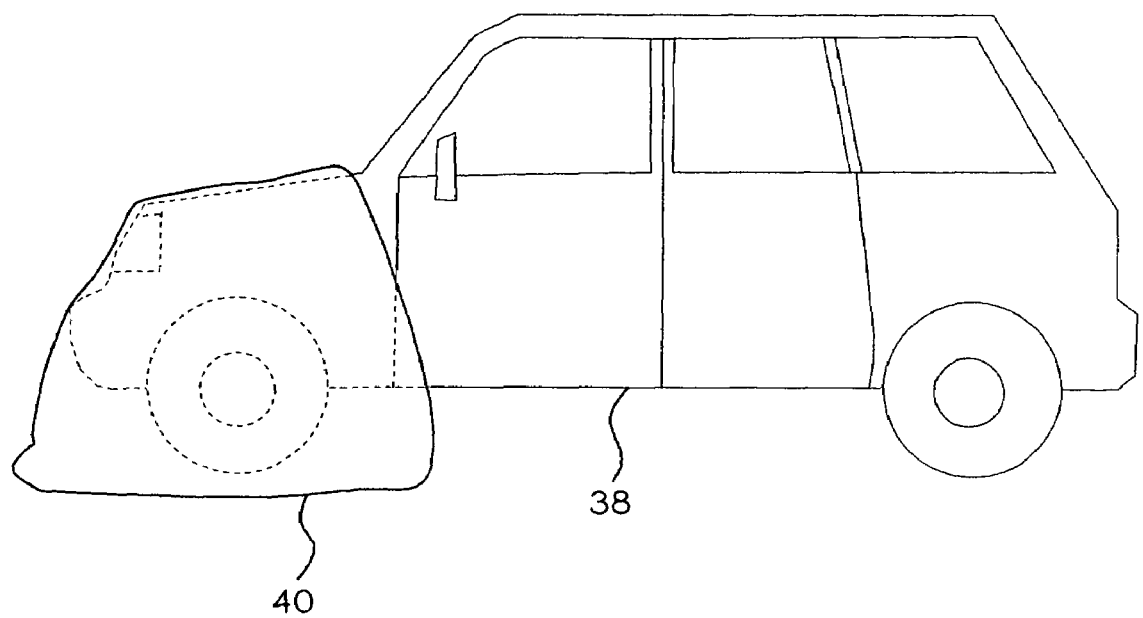
FIG. 4 shows the side view of a vehicle with a smaller traffic collision cover hiding only the front part of the vehicle.

FIG. 4 shows the side view of a vehicle 38 with a smaller traffic collision cover 40 hiding only the front part of the vehicle 38. The smaller traffic collision cover 40 is used to hide some or all of the damage done to the front end of the vehicle 38 due to an accident.

Figure 5:
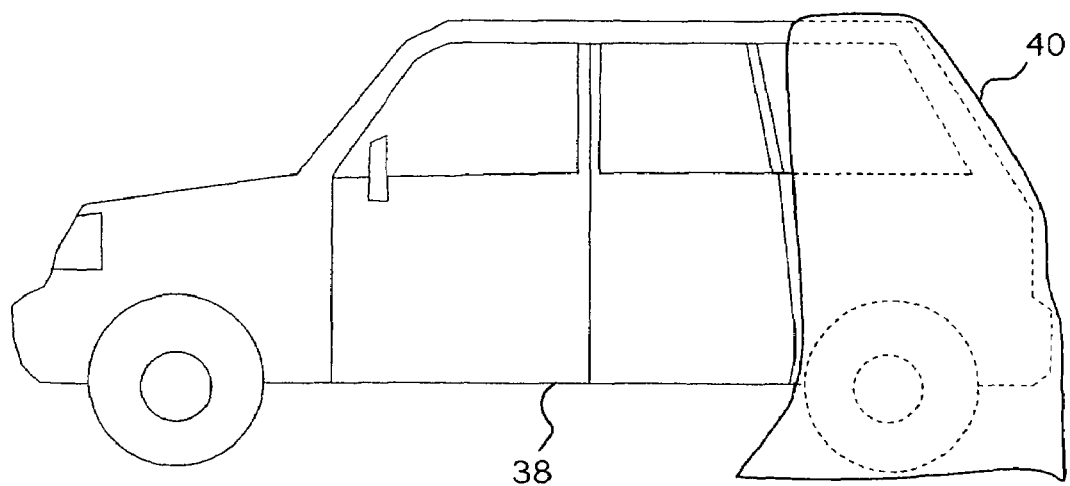
FIG. 5 shows the side view of a vehicle with a smaller traffic collision cover hiding only the back part of the vehicle.

FIG. 5 shows the side view of a vehicle 38 with a smaller traffic collision cover 40 hiding only the back part of the vehicle 38. The smaller traffic collision cover 40 is used to hide some or all of the damage done to the back end of the vehicle 38 due to an accident.

OPERATION—PREFERRED EMBODIMENT—FIGS. 1, 3A, 3B, 3C, 4, 5

When a serious accident occurs, public safety personnel will be dispatched. After those involved in the accident have been cared for and removed from the vehicles, public safety personnel can unfold one or more of these inventions to cover or partially cover vehicles involved in an accident while waiting for additional emergency vehicles to arrive, such as ambulances, paramedics, highway patrol, fire trucks, or tow trucks. The magnets will temporarily adhere to the steel in the vehicle. The magnetism between the magnet and steel will hold the fabric in place under normal conditions. If high winds, adverse weather, or other conditions require additional support to hold this invention in place, public safety officials can use rope, string, ball ties, tie downs, tarp ties, bungee cords, hook-and-loop fasteners, or any other medium to secure this invention and/or can use external magnets to provide additional support. FIGS. 1, 3A, 3B, 3C, 4, and 5 illustrate the operation of this invention after being deployed on vehicles in an accident. Upon arrival of a tow truck at the scene, this invention can easily be taken off, folded or rolled, and placed back in the emergency vehicle.

There are many alternative uses including but not limited to the following:

1. This invention can be secured to the vehicle itself to prevent debris from falling off as the vehicle is being towed.
2. This invention can cover the underside of the vehicle being towed. This too prevents debris from falling off as the vehicle is being towed, but can also be used to ensure any evidence is not lost from a potential crime scene or an accident under investigation.
3. This invention can be attached to an emergency vehicle and another object, such as one or more vehicles in an accident, another emergency vehicle, a pole, or any other object to help restrict the view of the accident or crime scene. For example, this invention could be attached to the rear end of a fire truck and the rear end of a vehicle in an accident to help obscure the accident site.
4. This invention can be attached to two or more vehicles in an accident. For example if one vehicle rear ends another vehicle, the front end of one vehicle and the rear end of the other vehicle can be covered with one traffic collision cover to hide most of the damage. By not covering the doors of either vehicle, emergency personnel can continue to extricate and provide medical attention to the occupants in the accident without interruption.

By hiding the vehicle damage from the public view, it is anticipated traffic will flow faster past an accident scene. This not only helps to minimize commute times for motorists, but may also reduce how long an accident scene exists since ambulances, tow trucks, and additional emergency vehicles may be able to reach the accident scene quicker. In a few cases by supporting quicker response times of additional emergency vehicles, such as an ambulance or paramedics, the use of this invention may save lives.

DESCRIPTION AND OPERATION—ALTERNATIVE EMBODIMENTS—FIGS. 6 THROUGH 9

Figure 6:
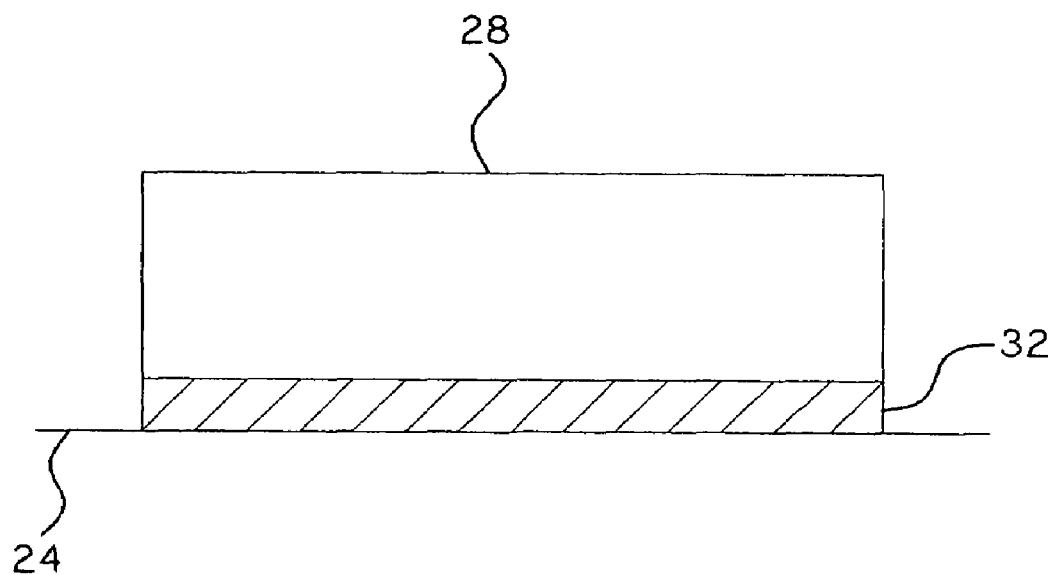
FIG. 6 shows a side view of an alternative method of attaching one magnet to the fabric using an adhesive, such as glue.

FIG. 6 shows a side view of a method of attaching one magnet 28 to a fabric 24 using an adhesive 32, such as glue. This method could be used to glue all magnets used to the traffic collision cover. For the purpose of an example, the magnet 28 is encased in plastic.

Figure 7:
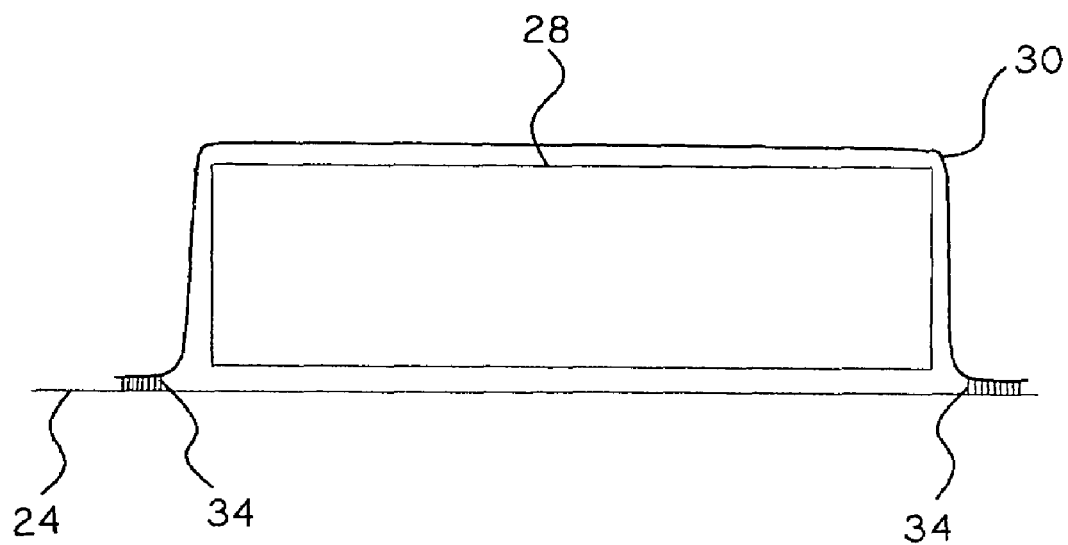
FIG. 7 shows a side view of an alternative method of attaching one magnet to the fabric by using a small strip of additional fabric and sewing the magnet into place, without using an adhesive.

FIG. 7 shows a side view of a method of attaching one magnet 28 to a fabric 24 by using a small strip of additional fabric 30 and sewing stitches 34 around the magnet 28 without using an adhesive. For the purpose of an example, the magnet 28 is encased in plastic.

Figure 8:
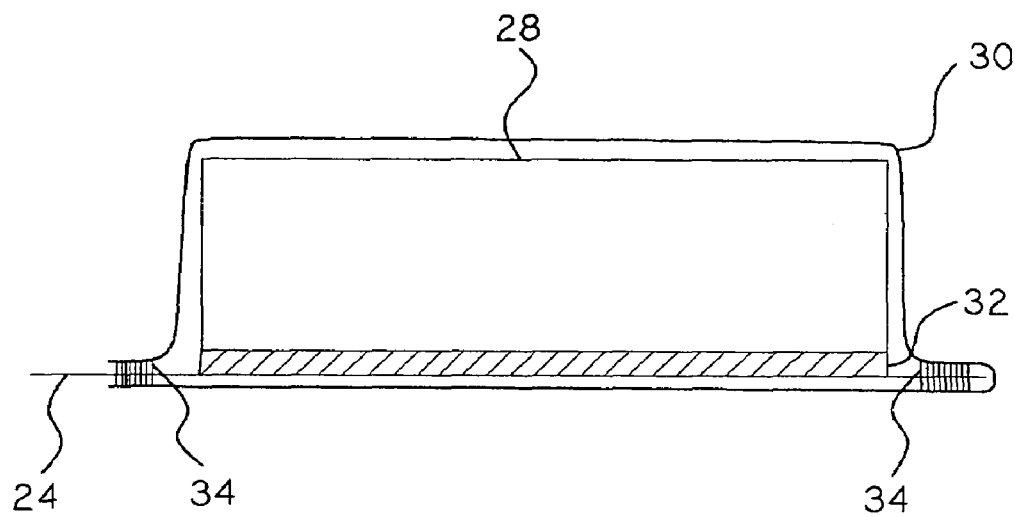
FIG. 8 shows a side view of an alternative method of attaching one magnet to the fabric by using an adhesive to attach the magnet to the fabric, wrapping a small strip of additional fabric around the edge of the fabric, and sewing the magnet into place to provide additional support.

FIG. 8 shows a side view of a method of attaching one magnet 28 to a fabric 24 by using an adhesive 32 to attach the magnet 28 to the fabric 24. Then a small strip of additional fabric 30 is wrapped around the fabric's 24 edge, sewing stitches 34 around the magnet 28 to provide additional support. The additional fabric 30 is folded under the fabric 24 before being sewed to provide extra support and covers the entire magnet with enough additional fabric 30 to be able to sew all around the magnet 28. The stitches 34 would go through the additional fabric 30 twice (top and bottom) and go through the fabric 24 once. One alternative would be to move the magnet 28 closer to the edge and sew stitches 34 on three sides of the magnet, but not sew stitches along the edge. For the purpose of an example, the magnet 28 is encased in plastic.

FIG. 6, FIG. 7, and FIG. 8 illustrate three alternative ways the magnets could be attached to the fabric, but other similar configurations are possible. In addition, magnets can be attached to the fabric using a heat bonding method, can be taped to the fabric, or be attached by any other method or combination of methods. An alternative embodiment for this invention is to have fabric, which does not have any magnets attached to it prior to being placed on a vehicle, use magnets to hold the fabric to one or more vehicles involved in an accident.

Figure 9:
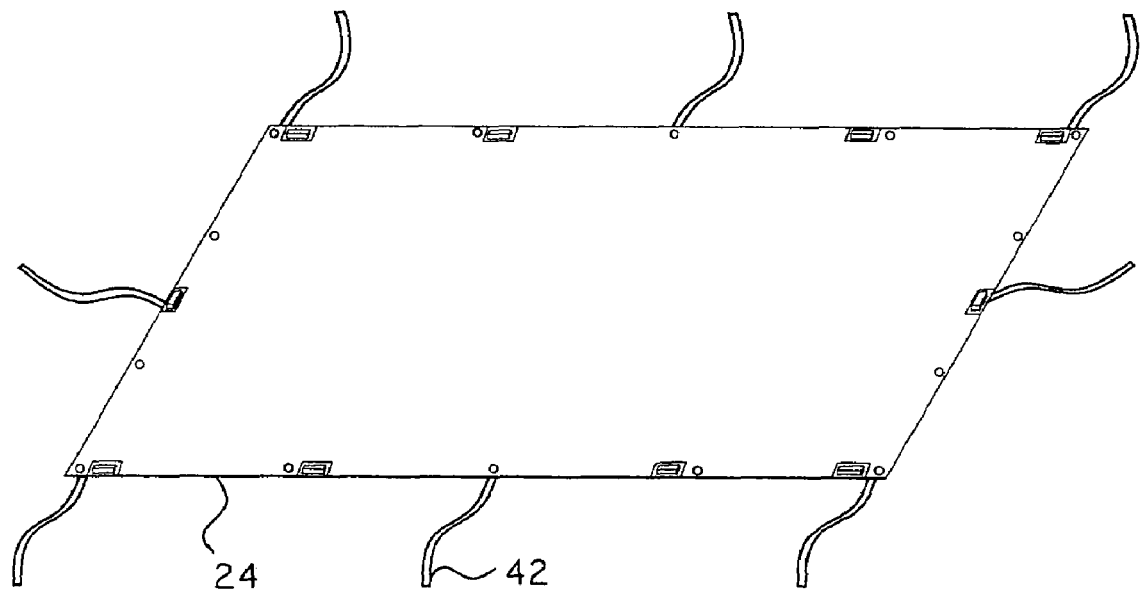
FIG. 9 shows an alternative embodiment for this invention using appendages to secure this invention to one or more vehicles involved in a traffic accident.

FIG. 9 shows a perspective view of another alternative embodiment for this invention. The appendages 42 can be sewed, heat bonded, glued, or use other means to attach appendages 42 to the fabric 24. Examples of appendages 42 include but are not limited to rope, string, ball ties, tie downs, tarp ties, bungee cords, hook-and-loop fasteners, or other means. When the appendages 42 are connected together and tightened, they secure the fabric 24 to the vehicle. In the alternative embodiment, magnets may or may not be present to attach this alternative embodiment to one or more vehicles to hide the damage done in an accident.

CONCLUSION, RAMIFICATIONS, and SCOPE

I have invented a traffic collision cover. The advantages of this invention over prior art are:

1. This invention is significantly smaller, takes up less space, and is lightweight, while still supporting the main goal of restricting the motorists' view of an accident.
2. There is no temporary wall barrier setup at the accident scene to restrict the view of the vehicles involved in the accident to passing motorists. Instead, the present invention physically attaches itself to one or more vehicles involved in the accident.
3. There is no large, upright surface area which would need to withstand the full force of the wind when this invention is attached to a vehicle.
4. Emergency vehicles are free to move at any time as emergency vehicles are not used to provide support for this invention.
5. This invention may be set up and taken down faster than most, if not all, prior art.
6. This invention costs less to build than most, if not all, prior art.
7. As an option, this invention can stay attached to the vehicle in order to wrap the vehicle as it is being towed. This potentially could prevent a new accident from occurring, one caused by debris falling off from the original accident.
8. This invention can optionally cover the underside of a vehicle as it is being towed to prevent evidence from being lost from a potential crime scene or accident under investigation.
9. This invention can be attached to an emergency vehicle and another object to act as a curtain to restrict the view of an accident or crime scene.
10. By hiding vehicle damage from the public view, it is anticipated traffic will flow faster past an accident scene. This not only helps minimize commute times and conserves gasoline for motorists, but may reduce how long an accident scene exists since additional emergency vehicles may be able to reach the accident scene quicker.
11. Reducing how long an accident scene exists, decreases the number of secondary accidents caused by drivers who are distracted (e.g., cell phones, reading, eating, video screens) or impaired (e.g., drugs, alcohol, stress, fatigue) while driving past the accident scene. Secondary accidents are usually more severe than the original accident.
12. By supporting quicker response times of additional emergency vehicles, the use of this invention may save the lives of those in the original accident and of emergency personnel who respond to the accident.

While particular embodiments of this invention have been shown throughout this document, numerous variations and alternate embodiments are likely to occur to those skilled in the art. As other forms of this invention are possible, the scope of this invention should not be taken as being limited in anyway by the particularity of the embodiments described in this document.

Thus the scope of this invention should be determined by the appended claims and their legal equivalents, and not by the examples given.

What is claimed is:

1. A cover for use on one or more vehicles involved in an accident, said cover comprising:
   a) a rectangular sheet made from fire retardant fabric;
   b) a plurality of magnets attached along all edges of each said sheet, said magnet being opposed to one of said magnets on an opposite side of said sheet;
   c) said sheet magnetically adheres to one or more said vehicles to hide damaged area when disposed, where said sheet fully or partially hides any one side;
   d) said plurality of magnets are covered with a plastic coating;
   e) a strip of fabric disposed upon each magnet, the periphery of said strip attached to said sheet; and,
   f) where each of said plurality of magnets is positioned upon said sheet so that the polarity of one side is of the opposite polarity of each said opposed magnet, said plurality of magnets attach to each other when said sheet is selectively folded in half or in quarters both lengthwise or widthwise respectively.

* * * * *